United States Patent [19]

Bullock et al.

[11] E Re. 30,017

[45] Reissued Jun. 5, 1979

[54] SEAMBUSTING AND PRESSING APPARATUS

[75] Inventors: Norman J. Bullock, Prospect; Frank A. Wendt, Jeffersontown; Laddie A. DePas, Louisville, all of Ky.; Walter P. Goodman, New Albany, Ind.

[73] Assignee: W. M. Cissell Manufacturing Company, Louisville, Ky.

[21] Appl. No.: 918,330

[22] Filed: Jun. 22, 1978

Related U.S. Patent Documents

Reissue of:

[64] Patent No.: 3,964,185
Issued: Jun. 22, 1976
Appl. No.: 600,827
Filed: Jul. 31, 1975

U.S. Applications:

[63] Continuation-in-part of Ser. No. 524,642, Nov. 18, 1974, Pat. No. 3,916,546.

[51] Int. Cl.[2] ..... D06F 69/00
[52] U.S. Cl. ..... 38/1 B; 38/14
[58] Field of Search ..... 38/1 B, 11, 14, 16, 38/25-30; 223/73

[56] References Cited

U.S. PATENT DOCUMENTS

| | | | |
|---|---|---|---|
| 1,725,033 | 8/1929 | Weisner | 38/1 B |
| 1,784,200 | 12/1930 | Piepenbring | 38/14 X |
| 2,197,448 | 4/1940 | Chinnici | 38/14 |
| 3,865,285 | 2/1975 | McCormack et al. | 38/1 B |
| 3,881,264 | 5/1975 | Grazzini | 38/1 B |

*Primary Examiner*—Louis Rimrodt
*Attorney, Agent, or Firm*—Wood, Herron & Evans

[57] ABSTRACT

The apparatus includes an elongated buck having an upper convex surface which supports the seam with the edges thereof outboard, and a portable iron having a concave bottom surface and a point nose which cooperates with the convex buck to simultaneously open and press the seam sandwiched therebetween as the iron moves in a forward direction thereover. The bottom edge of the iron is recessed on either side of the nose to permit the opened edges of the seam forward of the nose to flow smoothly beneath the iron as the iron advances thereover, preventing bunching of the seam forward of the iron as it advances. A jet of steam directed downwardly and forwardly is emitted from the nose of the iron to moisten the opened seamed edges and thereby enhance the permanency of the overbusting operation.

In one form of the invention, the outboard end or nose of the buck, which is inserted into the pant leg when dressing it on the buck, is provided with a smoothly contoured V-shaped notch which guides the seam which is to be overbusted into proper position atop the buck, expediting the dressing operation. Additionally, the buck is provided along its length on its underside surface with downwardly directed compressed air jets which apply a radially outwardly and downwardly directed force against the lower longitudinal one-half section of the pant leg from the interior thereof, in turn pulling the upper seam of a pant leg dressed atop the buck tightly thereagainst to maintain it in position during the overbusting operation.

12 Claims, 19 Drawing Figures

SEAMBUSTING AND PRESSING APPARATUS

Matter enclosed in heavy brackets [ ] appears in the original patent but forms no part of this reissue specification; matter printed in italics indicates the additions made by reissue.

*This application is a continuation-in-part of an application of Norman J. Bullock, Frank A. Wendt, Laddie A. DePas and Walter P. Goodman, entitled SEAMBUSTING APPARATUS AND METHOD, Ser. No. 524,642, filed on Nov. 18, 1974, now U.S. Pat. No. 3,916,546, issued on Nov. 4, 1975.*

This invention relates to a method and apparatus for opening the mating fabric edges of a seam and thereafter pressing the opened seam edges such that they remain flat against the fabric.

By way of background, in the course of manufacturing a garment, such as a pair of trousers or other article, it is often necessary to join two pieces of fabric along a line known as a seam. Although there are different types of seams, one common type found on the inside and outside of trouser legs, termed the "inseam" and "outseam", is formed during manufacture by superimposing the front and rear trouser leg fabric panels such that the "right" sides of the fabric panels contact each other, and then joining the superimposed panels with a sewing machine or the like along opposite longitudinal margins thereof approximately ¾ inches inboard of the outer edges of the fabric. The joint between the fabric panels is herein called the "seam", the line along which the stitching or the like is made is herein called the "seam line" and the ¾ inches sections of fabric outboard of the seam line are herein termed the "seam edges".

When the two fabric panels of a trouser leg have been sewn along opposite edges in the manner indicated above, a tubular garment structure for enclosing the leg is produced, but since the "right" side of the fabric panels face each other the trouser leg tube is inside-out. When the trouser leg is turned right-side-out the edges of each seam, that is, the portions of fabric outboard of the seam line along which the stitching is located, are "closed", that is, are in face-to-face contact. The edges of the two closed seams of a trouser leg, i.e., the "inseam" and "outseam", project inwardly when the garment is right-side-out, and if permitted to remain in such condition could cause discomfort to the wearer's leg or the like and/or produce unsightly bulges, wrinkles or the like in the finished garment.

To remedy the above situation, it has been the practice in the industry to subject the closed seam to a "seambusting" operation, that is, to spread apart or open the seam edges, and while so spread press them flat against the trouser leg fabric panels which adjoin the seam line. Typically, this has been done by placing the trouser leg inside-out on a flat pressing board and thereafter running a portable iron with a pointed nose and a flat bottom longitudinally along the seam to simultaneously spread the seam edges and press them flat. Although the pressing board and the bottom surface of the iron between which the open seam is sandwiched during the pressing operation are both flat, there is a tendency of the seam edges to partially return to their closed position following pressing, a condition known in the industry as "spring-back". The degree to which spring-back occurs depends in large measure on the nature of the fabric and is particularly troublesome with synthetic fabrics, especially polyester knits.

Although spring back, unless extreme, is not likely to result in discomfort to the wearer's leg, it can result in unsightly bulges in the completed garment. Specifically, after the seam has been opened and pressed flat, i.e., busted, the trouser legs are turned right-side-out and given a final press to establish the creases along the front and rear of the trouser legs. If appreciable spring-back of the seam edges along the inseam and outseam has occurred, when this final press is made, one or both of the sprung back seam edges may "crumble", i.e., not lie flat against the trouser leg fabric adjoining the seam, producing an unsightly bulge in the finished garment.

It has been the object of this invention to provide an apparatus and method for busting a seam which minimizes spring back. This objective has been accomplished in accordance with certain principles of this invention by "overbusting" the seam, that is, pressing the opened edges of the seam of an inside-out garment such that they form a reflex angle substantially in excess of 180°, for example, 230°. In this way, if the pressed seam edges do spring back, i.e., partially return to their previously closed position, since they were initially overbusted, i.e., pressed to a reflex angle substantially exceeding 180°, the resultant position of the seam edges following spring-back is likely to be an angle of approximately 180°, that is, flat.

In a preferred form of the invention, pressing of the seam edges to form a reflex angle substantially exceeding 180°, that is, overbusting, is accomplished by pressing the seam on a buck having a convex surface with an iron having a concave surface, with the seam edges located adjacent the concave surface of the iron. Preferably, the radius of curvature of the convex buck and the concave iron is approximately one inch, although radii of curvature between ½ inch and 2 inches are satisfactory.

Configuring the buck and iron in the manner indicated provides sufficient overbusting to insure that any spring-back which occurs will not result in crumpling of the seam edges when the trouser legs are turned inside-out and given a final press to produce the front and rear creases. In addition, and assuming the radius of curvature is not too small, the configuration of the upper surface of the buck on which the seam is placed is not sharply contoured or ridged. If a sharp contour or ridge were to exist, positioning of the seam on the buck would be critical in the sense that it would be necessary to precisely align the seam line over the buck ridge to produce a satisfactorily busted seam. Finally, since the buck and iron have smoothly contoured surfaces between which the same is sandwiched during busting, if the seam is dressed on the buck such that the seam line lies along a curved path rather along a straight line, the seam can still be opened and overbusted, even though such seam line path deviates from a straight line. This is accomplished by merely "steering" the nose of the iron along the curved path of the seam line, that is, rotating the iron about the longitudinal axis of the buck to follow the curve of the seam line as the iron is translated longitudinally over the seam. This capability of the iron to be "steered" along a seam disposed in a curved path vis-a-vis a straight line is herein also termed "tracking".

In accordance with a further aspect of this invention, the opposite side edges of the lower surface of the iron sole plate, which converge in the front to form the nose of the iron that is inserted into the seam to open the edges thereof, are relieved or chamfered for a slight distance, e.g., one inch, on either side of the nose. This chamfering facilitates the smooth flow underneath the iron sole plate of the opened seam edges as the iron advances forwardly over the seam to simultaneously open and press the seam edges in the course of the seambusting process.

In accordance with a still further aspect of the invention, a jet of steam is directed downwardly and forwardly of the nose of the iron to moisten the opened seam edges prior to passage thereof underneath the iron sole plate. This is effective to enhance the permanency of the seam edge pressing operation.

In accordance with another and equally important aspect of this invention, a trolley is provided to support the iron for longitudinal movement along a seam dressed on the buck to facilitate the overbusting operation. The trolley includes an elongated horizontal main guide rail disposed above, and generally parallel to the buck. Mounted to the main guide for relative longitudinal movement with respect thereto is a carriage from which projects, in a horizontal direction transverse to the main guide rail, a second or storage guide rail. A telescoping vertically disposed iron-supporting member, to which the iron is pivotally secured at its bottom end, is suspended at its top end for longitudinal movement along the transverse storage rail. By virtue of the storage rail, the iron can be placed in a storage position displaced transversely from the buck, when the operator desires to mount or remove a garment from the buck and/or manipulate the seam with respect thereto, without having the operator's hands mechanically interfere with the iron.

In addition, and providing the carriage contacts the main guide rail at least two spaced vertical points, the iron will, when in its storage position at the outboard end of the storage guide rail whereat it is displaced from the main guide rail, apply a moment to the carriage to frictionally bind the carriage relative to the main guide rail. This binding action inhibits movement of the carriage, and hence the iron, longitudinally along the main guide when the iron is in its storage position. Such movement would otherwise tend to occur in practice since the main guide rail is often slightly tilted, either up or down, due to manufacturing imperfections, installation errors and the like.

In accordance with a still further aspect of the invention the outboard end or nose of the buck, which is inserted into the pant leg when dressing it on the buck, is provided with a smoothly contoured V-shaped notch which guides the seam which is to be overbusted into proper position atop the buck as the pant leg is being drawn over the buck during the dressing operation. The provision of the V-shaped notch expedites the pant leg dressing operation since it assists in proper orientation of the seam longitudinally along the upper central surface of the buck.

An additional feature of the invention is the provision of downwardly directed compressed air jets at spaced points along the length on the underside surface of the buck. The air jets, when a pant leg is dressed on the buck, collectively apply a radially outwardly directed force in a downward direction against the lower longitudinal one-half section of the pant leg from the interior thereof. This longitudinally distributed downward force effectively pulls the upper seam of the pant leg tightly against the top surface of the buck, maintaining it in the desired position during the overbusting operation.

These and other advantages and features of the invention will become more readily apparent from a detailed description thereof taken in conjunction with the drawings in which:

FIG. 1 is a perspective view of a preferred embodiment of the seambuster apparatus of this invention showing the general relationship of the horizontally disposed buck upon which the seam to be busted is positioned, the iron which is movable along the buck to bust the seam located thereon, and a trolley which supports the iron for movement between operative and inoperative positions relative to the buck;

Figure 14:
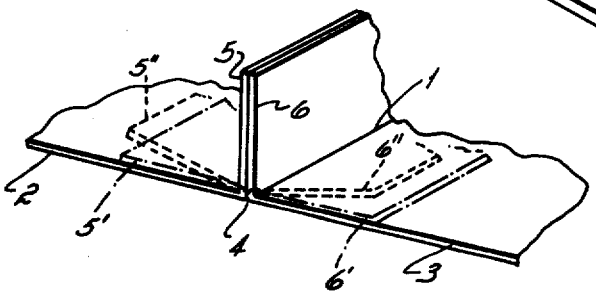
Figure 2:
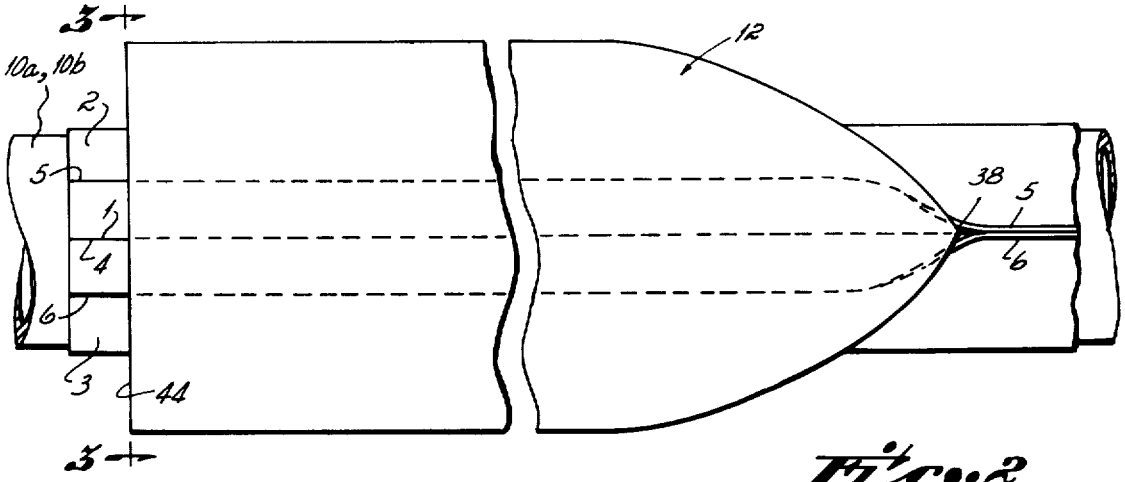
FIG. 2 is a top plan view of the iron and buck with a seam therebetween in the process of having its edges opened and pressed to effect busting.
Figure 4:
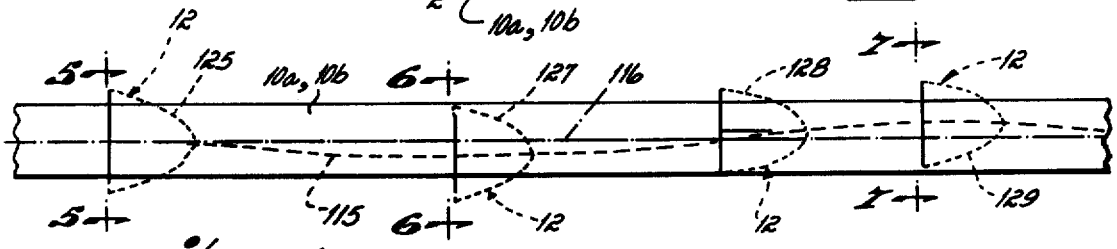
FIG. 4 is a plan view of the buck showing the iron in different positions along the length thereof as it tracks a seam positioned thereon with its seam line disposed in a curved path.
Figure 5:
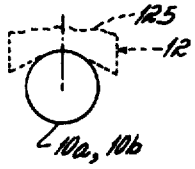
Figure 6:
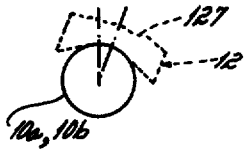
Figure 7:
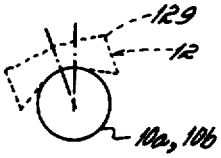
Figure 12:
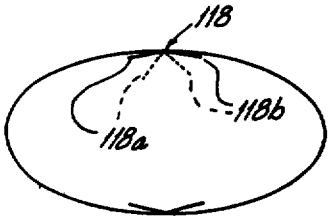
Figure 13:
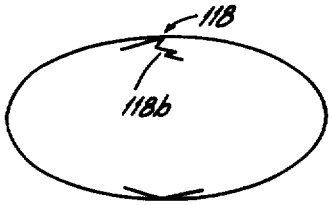
Figure 8:
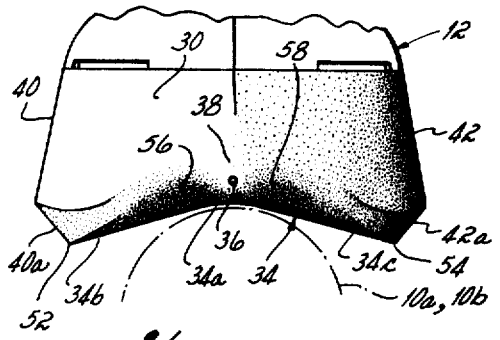
Figure 8A:
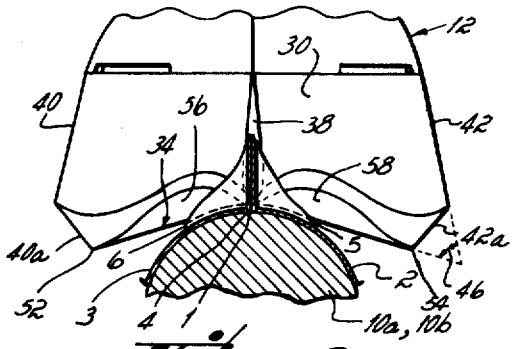
Figure 9:
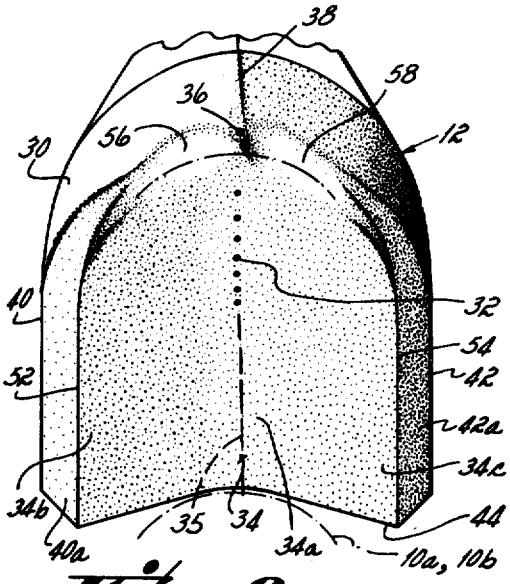
Figure 9A:
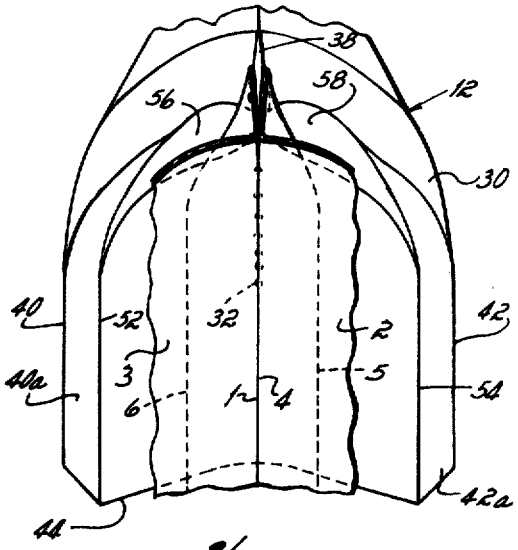
Figure 10:
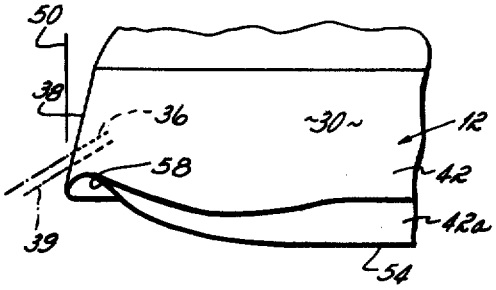
Figure 11:
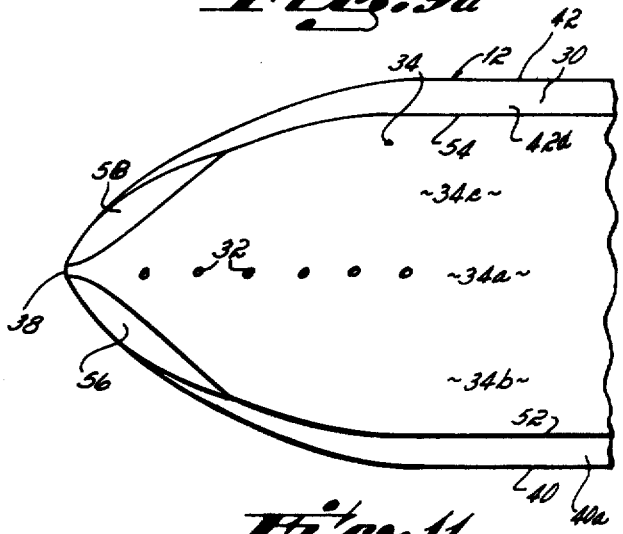
Figure 15:
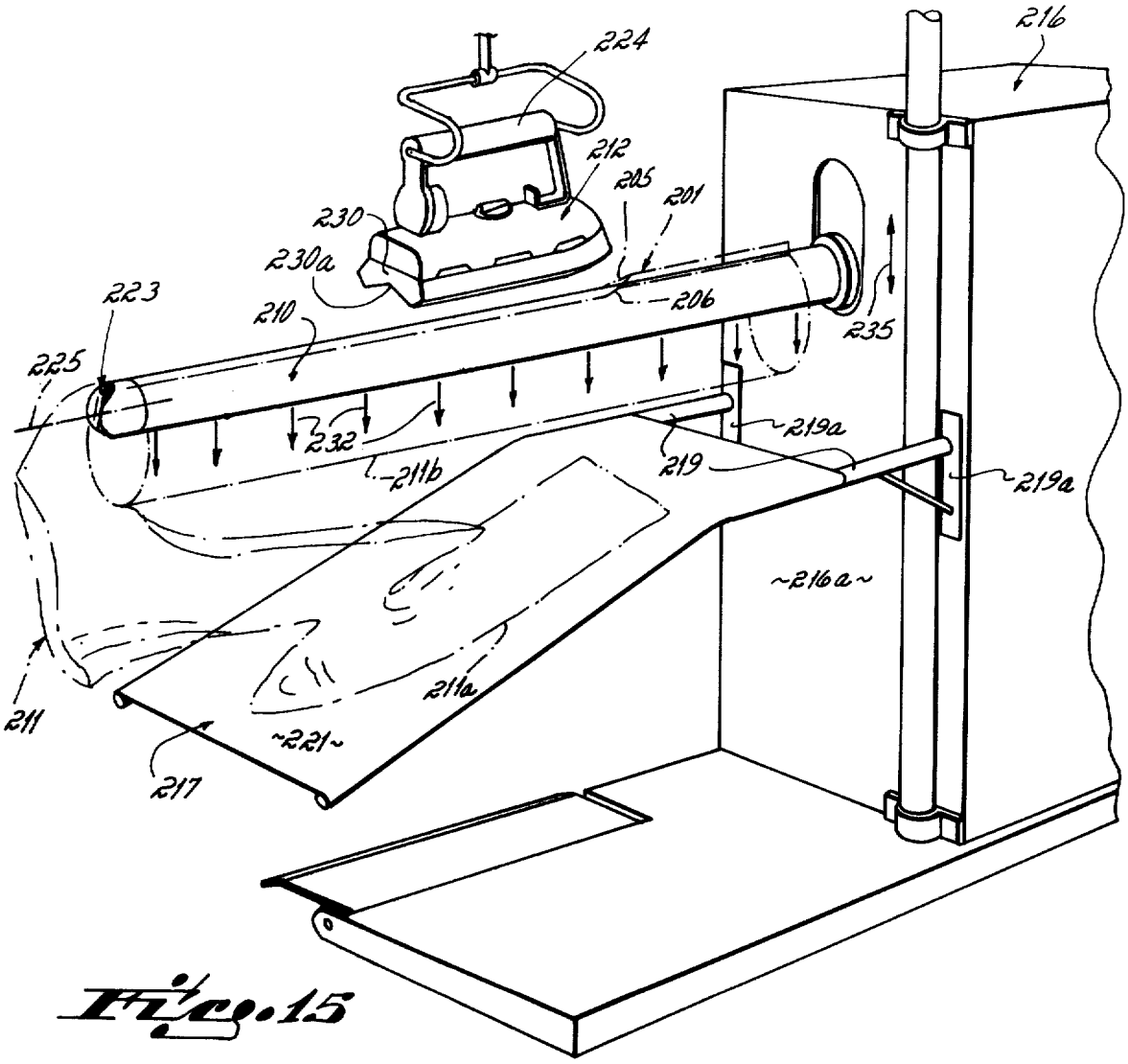
Figure 16:
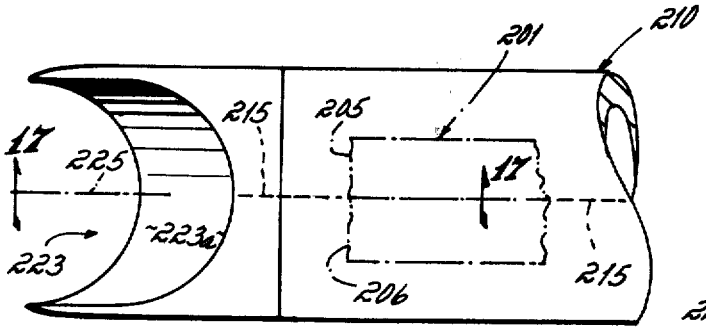
Figure 17:
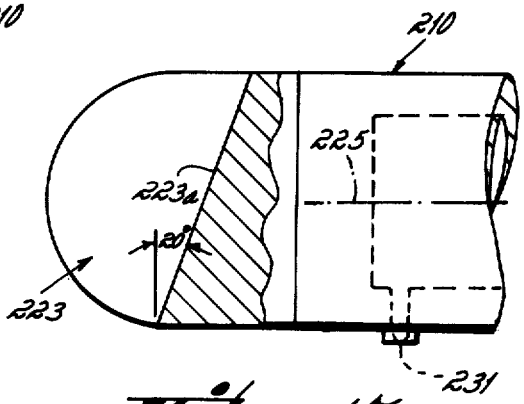

FIG. 5, 6, and 7 are cross-sectional views taken along line 5—5, line 6—6, and line 7—7, respectively, of FIG. 4;

FIG. 8 is a front elevational view of the nose of the iron;

FIG. 8a is a front elevational view of the nose of the iron shown opening a seam located on the buck;

FIG. 9 is a persective view of the iron showing the nose and bottom surface region thereof;

FIG. 9a is a perspective view of the iron showing the nose and bottom surface region thereof with respect to a seam located on the buck;

FIG. 10 is a side elevational view of the nose of the iron;

FIG. 11 is a bottom plan view of the iron sole plate;

FIG. 12 is a cross-sectional view of a trouser leg, turned right-side-out, showing busted seams with and without spring-back;

FIG. 13 is an elevational cross-sectional view of a trouser leg, turned right-side-out, showing a sprung-back busted seam which crumbled when the trouser leg was pressed to crease it;

FIG. 14 is a perspective view of a seam showing the edges and seam line thereof prior and after busting, with and without spring-back;

FIG. 15 is a perspective view of a modified form of buck having a V-shaped notch at its outboard end to guide the seam of a pant leg as it is being placed on the buck, thereby expediting the dressing operation, and further having downwardly directed air jets longitudinally distributed along the underside of the buck to urge and maintain the upper pant leg seam against the top surface of the buck during the overbusting operation;

FIG. 16 is a top plan view of the outer free end, or nose, of the buck depicted in FIG. 15; and FIG. 17 is a cross-sectional view of the outer free end, or nose, of the buck taken along line 17—17 of FIG. 16.

With reference to FIG. 14, two fabric panels 2 and 3 are shown joined together by a seam 1 along a seam line 4 by suitable stitching or the like. Prior to seambusting with the apparatus and method of this invention, the edges 5 and 6 of the seam 1 are "closed", that is, in face-to-face contact, and disposed generally perpendicularly to the [plan] *plane* of the fabric panels 2 and 3, as shown in solid lines. Following seambusting, the seam edges 5 and 6 ideally are disposed generally flat and parallel against fabric panels 2 and 3 as shown in phantom lines at 5' and 6'. If the busted seam edges have thereafter partially returned to their previously closed position to form an obtuse angle or perhaps even an acute angle if the return is sufficiently severe, due to the inherent elasticity of the material, a condition known as "spring-back", the edges of the seam 1 assume the position shown in dotted lines at 5'' and 6''.

Figure 1:
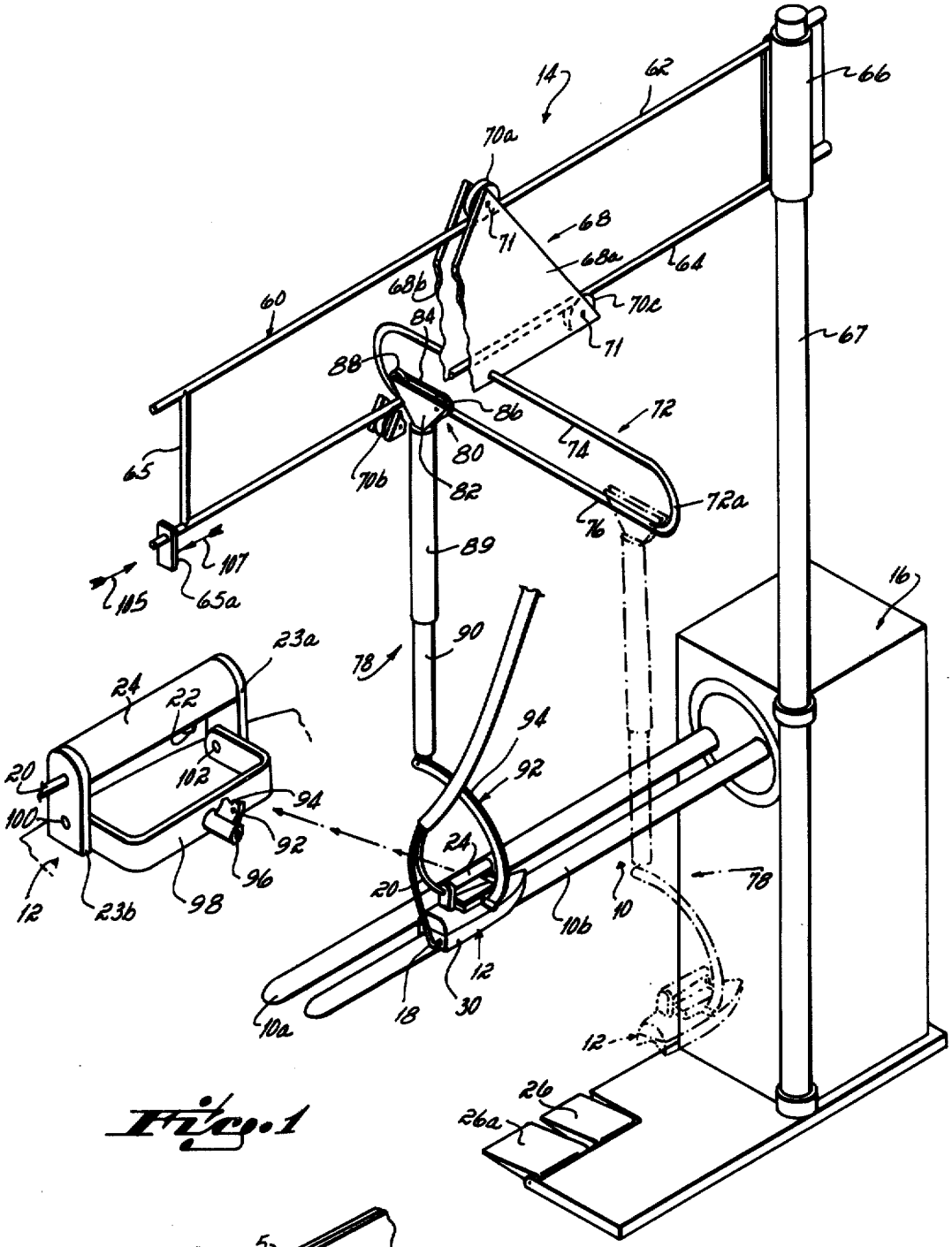

Referring to FIG. 1, a preferred form of the seambusting apparatus of this invention includes a buck 10 on which the seam 1 of a garment (not shown in FIG. 1), such as a pair of trousers, is placed, or dressed, to facilitate seambusting thereof. Also included is an iron 12 which when moved longitudinally over a seam 1 dressed on the buck 10 is effective to open and press the edges 5 and 6 of the seam, that is, to bust the seam. A trolley 14 alternatively supports the iron in an operative position (solid lines) aligned above the buck for seambusting movement longitudinally of the buck, or an inoperative storage position (phantom lines) disposed transversely of the buck to facilitate dressing the seam 1 on the buck 10 without mechanical interference with the iron 12.

The seambusting apparatus also includes a housing 16 which encloses various operating components of the apparatus such as a motorized drive (not shown) for rotating the buck 10 in increments of 180° about its horizontal axis to facilitate convenient busting of seams on opposite sides of a garment without removal thereof from the buck. A steam generator (not shown) may be within or external to housing 16 for supplying steam to the iron 12 via a hose 18 for moisturizing the seam during busting thereof and for supplying steam to the interior of the buck to bring it to the desired elevated operating temperature. Also includable within or external to housing 16 is a vacuum generator (not shown) for applying a vacuum to the interior of the buck which, via suitable orifices in the upper surface thereof, facilitates drying the busted seam and removal of moisture from the garment produced when the seam is moisturized by steam emitted from the iron. Finally, housing 16 may enclose the necessary electrical components (not shown) for supplying electrical energy to the iron 12 via an electrical cable 20 to heat the sole plate 30 thereof and for controlling the switching of the vacuum and steam generators under the control of a manually operated switch 22 conveniently located on a handle 24 of the iron. The switching of the vacuum may be caused also by depressing foot pedal 26a.

The seambusting apparatus also includes a depressable foot pedal 26 for conveniently energizing the motorized drive which rotates the buck or for unlocking the buck so that it can be rotated manually.

The buck 10, considered in further detail, preferably includes a pair of horizontally disposed spaced parallel elongated tubes 10a and 10b over which both trouser legs of a pair of pants whose inner and outer seams are to be busted, can be disposed. The leg buck tubes 10a and 10b, which have their outer ends sealed, have a hollow interior which communicates with a source of vacuum (not shown) located within or external to the housing 16. Although not shown, the upper surfaces of each of the elongated leg buck tubes 10a and 10b are preferably perforated to facilitate withdrawal of moisture from the seam of a garment dressed on the buck which has been moistened as an incident to the seambusting operation. The trouser leg bucks 10a and 10b are also each preferably covered with suitable cloth padding (not shown), and provided with internal heating means (not shown), either steam or electrical, for heating the buck to an elevated temperature. Finally, the length of the elongated buck legs 10a and 10b typically exceeds the length of the seam to be busted.

Figure 3:
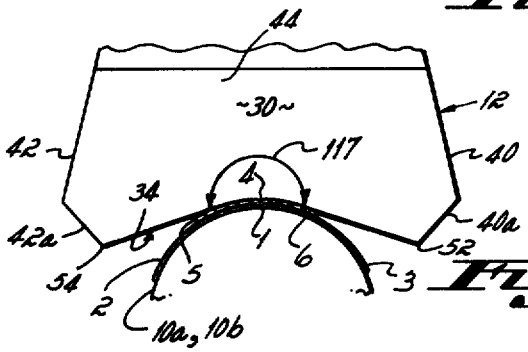
FIG. 3 is a cross-sectional view along line 3—3 of FIG. 2.

For reasons to be described in greater detail hereafter, the upper surface of each buck, on which the seam to be busted is positioned, is convex as shown best in FIG. 3. Preferably, the radius of curvature of the convex upper surface of each trouser leg buck 10a and 10b is between ½ inch and 2 inches, with approximately 1 inch being optimum, all for reasons which will be explained more fully hereafter.

The iron, as shown in FIGS. 1-3 and 8-11, includes a sole plate 30 of cast aluminum or other suitable material having a high heat storage capacity. Secured to the sole plate 30 via brackets 23a and 23b is the handle 24 on which the switch 22 is mounted for convenient operator control of the steam, vacuum and electrical energy sources contained in the housing 16. The sole plate 30 incorporates, in conventional manner, electrical heating means (not shown) for elevating the temperature of the sole plate to an operating level suitable for pressing garment seams and for automatically maintaining, such as by thermostatic control means, the desired sole plate temperature. The sole plate 30 also incorporates suitable passages therein (not shown) communicating with the steam line 18 to facilitate the flow of steam to a series of orifices 32 in the bottom surface 34 of the sole plate. The orifices 32 are disposed in the forward region of the bottom surface 34 of the sole plate 30 along the center line 35 thereof. With the orifices 32 so located, when the sole plate 30 is operatively positioned over the trouser leg buck 10a or 10b, the steam issuing from the orifices moistens the trouser seam sandwiched between the buck and the sole plate during pressing of the opened seam, as illustrated best in FIG. 9a. The steam passage (not shown) in the sole plate 30 which provides steam to the orifices 32, also communicates with an orifice 36 in the forward, pointed region, or nose 38 of the sole plate. The orifice 36 is configured to direct a jet 39 of steam downwardly and forwardly of the iron nose 38 to moisten the seam prior to passage thereof underneath the sole plate as an incident to pressing.

The sole plate 30, considered in further detail, includes the bottom surface 34, side surfaces 40 and 42, and a rear surface 44. The side surfaces 40 and 42 and the rear surface 44 are oriented to intersect the bottom surface 34 at an angle which is somewhere in the neighborhood of 90°, although such is not critical and in fact the angle 46 between the side surfaces 40 and 42 and the bottom surface 34 is somewhat less than 90°.

The side surfaces 40 and 42 converge in the front or forward section of the sole plate 30 in a nose or front edge 38 which makes an angle of approximately 15° with an imaginary vertical line 50 extending upwardly from the lowermost portion of the nose 38. The angularity of the nose 38 with respect to the imaginary vertical line 50 is critical, although it preferably exceeds 0° to promote opening of a seam in the manner to be described hereafter. The side surfaces 40 and 42 are chamfered as shown by reference numerals 40a and 42a, although this is not necessary. Sole plate sides 40 and 42, which include the chamfer surfaces 40a and 42a, join the bottom [surfaces] *surface* 34 of the sole plate 30 along bottom side edges 52 and 54 which converge at the nose or front edge 38 to establish the pointed forward region of the iron.

The edges 52 and 54 of the sole plate 30 in the vicinity of the nose 38 are recessed, as shown by smoothly contoured chamfer surfaces 56 and 58. As will be apparent later, the relieved or chamfered edges 56 and 58 facilitate the smooth flow of the opened seam edges 5 and 6 beneath the sole plate 30 as the iron 12 moves forwardly over the seam on the buck 10 in the course of opening the seam and pressing the seam edges thereof to produce a busted seam. Stated differently, relieving the edges 56 and 58 in the manner indicated prevent bunching, forward of the nose, of the opened seamed edges as the sole plate 30 advances forward along the seam to press the opened seamed edges and thereby complete the seambusting operation.

The bottom surface 34 of the sole plate 30 has a longitudinal central section 34a of generally concave configuration to correspond to the convex configuration of the upper surfaces of the trouser leg buck 10a and 10b which, as noted, in a preferred form, approximates a 1 inch radius of curvature. The width of the central section of the sole plate bottom surface 34 extends on either side of the imaginary center line 35 a distance sufficient to insure that the seam will be overbusted to minimize springback, as will be apparent hereafter. Extending longitudinally on either side of the central section 34a of the sole plate bottom surface 34 and tangential to the concave curvature of central section 34a are lateral sole plate surface sections 34b and 34c which, in a preferred form, are flat, i.e., have an infinite radius of curvature. As will be apparent hereafter in connection with FIGS. 4–7, the flatness of sole plate bottom sections 34b and 34c enables the iron to follow, or track, a seam disposed on the trouser leg bucks 10a and 10b which has the seam line thereof disposed along a generally curved path, that is, not in a straight line.

The trolley 14, considered in more detail, includes an elongated horizontal main guide rail 60 which preferably includes upper and lower vertically aligned, spaced, parallel guide rods 62 and 64. The guide rods 62 and 64 are secured via a bracket 66 to a vertical post 67. The guide rods 62 and 64 extend generally parallel to the trouser leg bucks 10a and 10b at a position spaced above the trouser leg bucks and slightly transversely displaced with respect thereto. The nature of the bracket 66 and the post 67 is such that the guide rods 62 and 64 of the main horizontal guide 60 remains stationary, that is, do not move in a vertical direction, either up or down, nor do they pivot about a vertical axis through the support post 67.

A carriage 68 is supported for relative movement along the main guide rail 60. The carriage 68, in a preferred form, includes vertical spaced parallel triangular plates 68a and 68b between which at the vertices thereof are mounted guide rolls 70a, 70b and 70c having a concave peripheral guide surface. Each of the guide wheels 70a, 70b and 70c is mounted for rotation about a horizontal axis by pins 71 extending between the plates 68a and 68b. The upper guide roll 70a rides along the top surface of upper horizontal guide rod 62 while the lower guide rolls 70b and 70c ride along the bottom surface of the lower horizontal guide rod 64. Extending perpendicularly from the carriage 68 is a storage guide rail 72 consisting of an upper guide rod section 74 and a lower guide rod section 76 which are joined at their outer ends 72a. The storage guide rail 72 is secured to the carriage 68 in any suitable manner such that it moves with the carriage 68 and extends in a horizontal direction perpendicular to the main guide rail 60.

An iron-support member 78 support the iron 12 from the storage guide rail 72, the storage guide rail 72 in turn being supported by the carriage 68 which is movably mounted on the main guide rail 60. The iron-support member 78 at its upper end is supported for relative movement along the lower guide rod 76 of the storage guide rail 72 via a roller assembly 80. The roller assembly 80 includes spaced vertical parallel plates 82 and 84 between which guide rolls 86 and 88 are pinned for rotation about horizontally spaced axes parallel to the main guide rail 60. Guide rolls 86 and 88 have concave peripheries such that they ride on the upper surface of the lower guide rod 76 of the storage guide rail 72. Secured to the lower portion of the plates 82 and 84 of the roller assembly 80 is the upper end of a longitudinally extendible and contractible pair of telescoping rods 89 and 90. Interconnecting the lower end of telescoping rod 90 and the iron 12 is a cradle assembly 92 which includes an arcuate bracket 94 which at its upper end is rigidly secured to the lower end of the telescoping rod 90. The lower end of the bracket 94 is pivotably connected via a horizontal pin 96 to the central section of a U-shaped yoke 98, the legs of which are pivotably connected via horizontal pins 100 and 102 to the front and rear vertical brackets 23a and 23b which mount the handle 24 to the iron 12.

The pinned connection between the yoke 98 and the brackets 23a and 23b which secures the handle 24 to the iron 12 permit the iron to pivot about a horizontal axis through the pins 100 and 102. The pivotal connection established by the pin 96 between the yoke 98 and the arcuate bracket 94 permits the iron 12 to pivot about a horizontal axis co-axial with the pin 96. The telescoping rods 89 and 90 which interconnect the roller assembly 80 and the cradle 92 facilitate the movement of the iron 12 in a vertical direction. To bias telescoping rods 88 and 90 toward axial contraction, a spring (not shown) is provided inside the telescoping rods which has its opposite ends connected to different ones of the rods. Finally, the relative movement of the roller assembly 80 along the storage guide rail 72 permits the iron 12 to be moved between an operative position underlying the main guide rail 60 over trouser seams of a garment dressed on the buck legs 10a and 10b and an inoperative or storage position (shown in phantom) displaced transversely from the main guide rail 60. In the inoperative or storage position, the iron 12 is substantially transversely displaced from the buck legs 10a and 10b to enable placement and removal of a pair of trousers on the buck leg 10a and 10b and manipulation of the seams with respect to the buck legs without mechanical interference between the operator's hands and the iron 12.

When the iron-support member 78 is in its storage position shown in phantom in FIG. 1, a clockwise moment is applied to the carriage 68, when viewed in the direction of arrow 105, via the storage guide rail 72, as a consequence of the downward force applied to the end 72a of the storage guide rail by the iron 12 which is displaced from the carriage 68. The moment applied to the carriage 68, since the carriage 68 contacts the main guide rail 60 at two vertically spaced points, namely, at wheel 70a and at wheels 70b, 70c, tends to frictionally bind or lock the carriage 68 with respect to the main guide rail 60, with the result that the carriage 68 tends to be restrained from longitudinal movement along the main guide rail 60.

Thus, when the iron 12 is displaced by the operator transversely of the buck legs 10a and 10b such that the roller assembly 80 translates to the end 72a of the storage guide rail 72, a clockwise moment is applied to the carriage 68 when viewed along line 105, inhibiting translational moment of the carriage 68 along the main guide rail 60. This tendency to inhibit relative movement between the carriage 68 and the main guide rail 60 when the roller assembly 80 has been positioned in the storage position is desirable in use, because, as a practical matter, the main guide rail 60 often is slightly tilted, either upwardly or downwardly, with respect to the horizontal. With the main guide rail 60 tilted with respect to the horizontal, the carriage 68 has a tendency to translate under the weight of the iron in one direction or the other along the main guide rail 60, the particular direction depending upon whether the main guide rail is tilted slightly upwardly or slightly downwardly. When the roller assembly 80 has been placed in the storage position, which usually occurs when the operator desires to manipulate the seam on the buck, mount trousers on the buck, or remove trousers from the buck, operator's hands are not on the iron. Under these circumstances, due to the normal tilt, either upwardly or downwardly, of the main guide rail 60, the carriage 68, absent the moment applied thereto via storage guide rail 72, would tend to translate in one direction or another on the main guide rail. Such translation, if permitted to occur, would cause the carriage to bang against either the bracket 66 or a vertical stop 65a attached to the end of guide rod 64.

The apparatus is placed in condition for operation by energizing the electrical current source for supplying electricity via cable 20 to raise the temperature of the sole plate 30 to the desired operating level. In addition, the heating means for the buck legs 10a and 10b, whether steam or electrical, is activated to raise the temperature of the buck legs to the desired operating level. With the iron sole plate 30 and the buck legs 10a and 10b at operating temperature, the roller assembly 80 is placed at the end 72a of the storage guide rail 72 to displace the iron 12 transversely from the buck legs 10a and 10b. With the iron located in its storage position, the legs of a pair of trousers, turned inside out to expose the edges of the seam, are dressed on the buck, that is, one trouser leg is placed on buck leg 10a and the other trouser leg placed on leg 10b. When the trouser legs are placed on the buck legs 10a and 10b the seams are manipulated by the operator such that the inseam of one trouser leg is located along the upper surface of one of the buck legs and the outseam of the other trouser leg located along the upper surface of the other buck leg. Ideally, the seam line 4 of each seam, along which the edges 5 and 6 of the joined fabric panels 2 and 3 are stitched, is positioned in alignment with a straight line 116 running along the uppermost surface of the respective buck legs 10a, 10b. However, and as will become apparent hereafter in connection with the discussion of FIGS. 4–7, alignment of the seam line 4 of the seam being busted with respect to straight line 116 on the upper surface of buck legs 10a, 10b is not critical.

With the seams of the trouser legs dressed on the top of the buck legs 10a or 10b, the roller assembly 80 is moved to its inboard or operative position shown in solid lines in FIG. 1 by gripping the iron handle 24 and moving it toward the buck 10 from its outboard or storage position underlying the end 72a of the storage guide rail 72. Movement of the roller assembly 80 brings the iron 12 into overlying relationship with respect to the buck 10. The iron 12, if it is not already overlying the outboard end of the buck 10, is so placed by movement of the iron in the direction of arrow 107 which causes the carriage 68 to translate along the main guide rail 60. Depending upon which seam is to be operated upon, i.e., the seam dressed on buck leg 10a or the one on buck leg 10b, the iron 12 is positioned by the operator to overly either buck leg 10a or buck leg 10b.

The nose 38 of the iron 12 is next inserted in the outboard end of the seam, forcing apart or opening the edges 5 and 6 thereof which, prior to insertion of the iron nose therebetween, were closed, i.e., extending upwardly and in contact with each other. With the nose 38 of the iron 12 engaged between the now separated, or opened, seam edges 5 and 6, the iron is moved forwardly, that is, advanced in the direction of arrow 105. Continued movement of the iron in the forward direction parallel to arrow 105 progressively opens the normally upstanding, closed seam edges 5 and 6. Simultaneously, the progressively opening seam edges 5 and 6 are pressed by the central section 34a of the iron sole plate bottom surface 34 as the seam edges pass underneath the sole plate. Due to the concave curvature of teh central sole plate bottom surface section 34a which overlies the opened seam, and the underlying convex surface of the upper portion of the buck leg 10a or 10b, the opened seam edges 5 and 6 as they pass beneath the iron sole plate are pressed such that they make a reflex angle 117 which substantially exceeds 180°, e.g., 230°. Such opening and pressing of the seam to a reflex angle substantially exceeding 180°, which herein is termed "overbusting", reduces the likelihood that the seam edges 5 and 6, when the overbusting operation is complete and the trousers removed from the buck and turned inside out, will achieve significant partial closure, i.e., will return to a significant degree to their former closed position.

Partial return of the opened and pressed seam edges to their closed position, termed "springback", which is reduced in accordance with this invention by virtue of "overbusting", reduces the tendency of the seam edges to be crumpled when the pants seams are thereafter pressed right-side-out during garment fabrication. If, as shown in FIGS. 12 and 13, significant springback has occurred as illustrated by seam 118, when the pants are pressed right-side-out during garment fabrication one or the other of the edges 118a or 118b of the sprungback seam 118, such as seam edge 118b, may get crumpled when the seam is given the final pressing righ-side-out during garment fabrication. The crumpled seam edge 118b is shown in exaggerated form in FIG. 13.

By virtue of the downwardly and forwardly directed steam jet 39 emanating from orifice 36 in the iron sole plate nose 38, the closed seam edges 5 and 6, as they are opened by the forward movement of nose 38 inserted therebetween, are moistened to enhance the permanency of the overbusting pressing which occurs as the iron sole plate bottom surface 34 [passes] *presses* over the opened seam. The permanency of the overbusting pressing operation is further enhanced by the moisturizing of the opened seam which occurs as the opened seam edges 5 and 6 pass underneath steam-emitting orifices 32 disposed along the center line of the central section 34a of the iron sole plate bottom surface 34.

By virtue of the relieved sections 56 and 58 of the bottom side edges 52 and 54 whereat the bottom sole plate surface 34 joins the side sole plate surfaces 40 and 42, the opened seam edges 5 and 6, as the iron moves forwardly over the seam, tend to feed smoothly underneath the sole plate 30 on either side of the center line 35 thereof without any tendency to bunch forward of the nose, which experience has shown otherwise tends to occur when such relief sections 56 and 58 are omitted.

As noted previously, the iron sole plate bottom surface regions 34b and 34c, which extend the length of the iron on either side of the central surface region 34a, are generally flat, i.e., have an infinite radius of curvature, or at least have a radius of curvature substantially greater than that of the central section 34a. As a consequence, the iron 12, when engaged with the buck leg 10a or 10b, can be pivoted to a substantial degree about a vertical axis through the center of the iron while still enabling the forward portion of the central surface section 34a adjacent the nose 38 to remain in contact with the seam on the upper surface of the buck leg 10a or 10b. As a consequence, if the seam of the garment dressed on the upper surface of the buck leg is not disposed in a straight line in alignment with imaginary line 116 (FIG. 4), but rather follows a curved path such as curved line 115, the iron will follow, or track, the seam by steering the nose along the curved seam line 115 between the seam edges to simultaneously open the seam and overbust it, as described previously.

When the seam line 4 is in alignment with the imaginary line 116 of the leg buck, the center line 35 of the sole plate bottom surface is in alignment with the imaginary line 116 on the buck legs, as shown in FIG. 5, and the schematically shown iron designated with reference numeral 125 in FIG. 4. When the seam line 4 is displaced to one side or the other side of the imaginary line 116 on the buck leg, the center line 35 of the sole plate bottom surface is displaced to one side or the other side, respectively, of the imaginary line 116, as shown in FIGS. 6 and 7, respectively, and by schematically shown irons designated 127 and 129, respectively, depicted in FIG. 4. Were sole plate bottom surface regions 34b and 34c to have the same radius of curvature as buck 10a and buck 10b, it would not be as convenient to steer the iron between positions designated 125 and 127 and between positions designated 127 and 129 because the seam edges 5 and 6 tend to double back on themselves due to the radial motion of the iron. Further the absence of contact in regions 34b and 34c of the sole plate provides high unit pressure in the area 34a shown by the angle 117 which assures good pressing of the seam.

By virtue of having the radii of curvature of the buck legs 10a and 10b and the central section 34a of the sole plate bottom surface 34 no smaller than approximately ½ inch, the iron sole plate can be oriented such that its center line 35 is angled with respect to the curved seam line 115 while still maintaining the central sole plate bottom surface region 34a in contact with the upper surface of the buck leg. This further enhances the ability of the iron to track, or be steered, along a curved seam line 4 as shown in FIG. 4.

Finally, the smoothly contoured mating surfaces of the iron bottom and buck top permit the iron to be rotated about the buck axis as the iron advances along the buck over the seam. This ability to simultaneously advance and rotate the iron relative to the buck further enhances the steerability of the iron, that is, the ability of the iron to follow, or track, a seam disposed in a curved path on the buck.

The capability of steering the iron along a curved seam line, since it reduces the criticality in alignment required between the seam line 4 and the imaginary line 116 which is straight, provides a reduction in the amount of operator time required to dress the seam on the buck and hence reduces the unit time to overbust a seam.

Assuming the inseam dressed on buck 10b is first subjected to the overbusting operation, the outseam dressed on buck 10a is thereafter subjected to the same overbusting operation. The roller assembly 80 is now moved to the storage position. With the iron 12 transversely displaced from the buck 10, the buck 10 is rotated 180° such that buck 10a occupies the position formerly occupied by buck 10b and vice versa. The respective trouser legs are still, however, positioned on the same buck legs. With this done, the operator then dresses on buck leg 10a the inseam of the trouser leg whose outseam was overbusted on buck [10a] *10b*, and dresses on buck leg 10b the outseam of the trouser leg whose inseam was overbusted on buck leg 10a. The roller assembly 80 is returned to its operative position, and overbusting of the inseam and outseam dressed on buck legs 10a and 10b proceed in the manner previously described. When these last two seams have been overbusted, the operator again moves the roller assembly 80 to the storage position. The pants can now be removed from the buck 10 without interference with the iron 12.

Referring to FIGS. 15–17, a modified form of the seambusting apparatus of this invention is shown. With reference to these figures, the modified seambusting apparatus is seen to include a buck 210 on which the seam 201 of a garment 211, such as a pair of trousers, is placed, or dressed, to facilitate seambusting thereof. Also included is an iron 212 which when moved longitudinally over the seam 201 dressed on the buck 210 is effective to open and press the edges 205 and 206 of the seam, that is, to bust the seam. A trolley (not shown) supports the iron 212 in an operative position aligned above the buck 210 for seambusting movement longitudinally of the buck. The seambusting apparatus also includes a housing 216 which may enclose various operating components of the apparatus such as a steam generator (not shown) for supplying steam to the iron 212 via a hose (not shown) for moisturizing the seam 201 during busting thereof and for supplying steam to the interior of the buck 210 to bring it to the desired elevated operating temperature. Also included within or external to housing 216 is a vacuum generator (not shown) for applying a vacuum to the interior of the buck 210 which, via suitable orifices (not shown) in the upper surface thereof, facilitates drying the busted seam and removal of moisture from the garment produced when the seam is moisturized by steam emitted from the iron. The housing 216 may also enclose the necessary electrical components (not shown) for supplying electrical energy to the iron 212 via an electrical cable (not shown) to heat the sole plate 230 thereof and for controlling switching of the vacuum and the steam generators via a manually operated switch (not shown) conveniently located on the handle 224 of the iron. Finally, the housing 216 may enclose a source of pressurized gas, such as compressed air, which communicates with the interior of the buck 210 for reasons to be described hereafter.

Extending in a generally horizontal direction from the housing 216 and disposed below the buck 210 is a garment tray 217. The garment tray 217 may take the form of a pair of metal tubes 219, 219 secured at their inner ends by brackets 219a, 219a to the wall 216a of the housing 216. A fabric sheet 221 secured at its opposite longitudinal edges to the tray support tubes 219, 219 spans the support tubes and functions as a tray or shelf to support during the seambusting operation, as well as during dressing and undressing operations, that portion of a garment, such as a pant leg 211a of garment 211, which is not dressed on the buck 210. The support [arm] *arms* 219, 219 are preferably bent downwardly at a point intermediate their ends to space the fabric sheet or shelf 221 conveniently with respect to the buck 210.

The buck 210, like the buck 10 is shown in the embodiment of FIG. 1, takes the form of a horizontally disposed elongated tube over which the tubular trouser leg 211b of a pair of pants 211 whose inner and outer seams are to be busted, can be disposed. The leg buck or tube 210, which has its outer end sealed, has a hollow interior which communicates with a source of vacuum (not shown) located within or external to the housing 216. Although not shown, the upper surface of the elongated leg buck 210 is preferably perforated to facilitate withdrawal of moisture from the seam of a garment dressed on the buck which has been moistened as an incident to the seambusting operation. The trouser leg buck 210 is also preferably covered with suitable cloth padding (not shown) and provided with internal heating means (not shown), either steam or electrical, for heating the buck to an elevated temperature. The length of the elongated buck leg 210 typically exceeds the length of the seam to be busted. For reasons described in detail in connection with the seambuster depicted in FIG. 1, the upper surface of the buck 110, on which the seam to be busted is positioned, is preferably convex, having a radius of curvature between ½ inch and 2 inches, with approximately 1 inch being optimum.

The buck 210 additionally includes a smoothly contoured generally V-shaped notch, or slot, 223 at its outboard free end or nose. The notch 223 serves the advantageous purpose of guiding the upper seam 201 of a pant leg 211b as the pant leg is being drawn from right to left (as viewed in FIG. 15) over the buck 210, during the buck dressing operation. The guiding of the upper seam of a pant leg being dressed on the buck 210 provided by the notch 223 is such that the upper seam 201 is guided toward a position atop the buck 210 along an imaginary line 215 running longitudinally of the buck at the uppermost portion of its top surface.

The notch 223 has an inner base surface 223a which is preferably angulated at approximately 20° with respect to an imaginary vertical plane perpendicular to the longitudinal axis 225 of the buck such that as the trouser leg 211b is drawn rightwardly across the buck 210 during the dressing process the seam 201 will be cammed upwardly and rightwardly to enhance the seam-building function of the notch. In a preferred form of the invention in which the buck 210 with pad has an outside diameter of approximately 2¼ *inches*, the notch 223 has a radius of curvature of between approximately 1½ inches–2½ inches, preferably approximately 2 inches. In addition the notch 223 preferably has a cross-section which is semi-circular when viewed parallel to base surface 223a, as best shown in FIG. 16. Finally, the nose or outer free end of the buck 210 in which notch 223 is formed is preferably configured to have an overall shape (exclusive of the notch) which is semi-cylindrical as best shown in FIG. 17.

The buck 210 is provided with a plurality of orifices, of nozzles, 231 in its undersurface region which communicate with a source of pressurized gas, such as compressed air (not shown), located within the housing 216 or external thereto. The orifices 231 when provided with pressurized gas direct jets of air in a vertical direction from the underneath surface region of the buck 210 as shown by arrows 232. The air jets 232 apply a downward vertical force in a radially outwardly direction to the interior of the longitudinal one-half section of the tubular pant leg 211b dressed on the buck 210. The downward force pulls the upper one-half section of the pant leg 211b dressed on buck 210 which is in contact with the upper surface of the buck 210 in a downwardly direction, urging the seam 201 tightly against the upper surface of the buck to maintain it in the desired position aligned with imaginary line 215 during the seambusting operation.

The iron 212 preferably is in all respects identical to the iron 12 shown in FIGS. 1–3 and 8–11, and accordingly is not further described, except to note that the bottom surface 230a of the sole plate 230 thereof has a longitudinal central section of generally concave configuration to correspond to the preferred convex configuration of the upper surfaces of the trouser leg buck 210 to facilitate overbusting of a seam dressed thereon to minimize spring-back.

Preferably, the buck 210 is mounted to the housing 216 by means (not shown) which permit the vertical position, or height, of the horizontally disposed buck to be varied as indicated by the double headed arrow 235.

In practice, it has been found that the nozzles 231 are preferably spaced apart at intervals of approximately 8 inches, have a nozzle opening or orifice diameter of 3/32 inches, and are pressured with compressed air at 40 lbs. per square inch gauge (PSIG). Obviously, the nozzle spacing and orifice size, as well as the gas pressure can be varied depending on the circumstances. For example, as the weave of the fabric of the pants legs becomes looser, i.e., more porous, the pressure is preferably increased and vice versa. Similarly, as the diameter of the pant leg increases, the pressure is increased and vice versa. The preferred pressure of 40 PSIG noted previously has been found suitable for trouser legs having a diameter of approximately 9 inches and fabricated of a fabric of a loosely woven polyester knit type. Pressures as low as 10 PSIG can be utilized with tightly woven cotton fabric pants.

While the foregoing description has been made with particular emphasis on a preferred embodiment, it will be recognized by those skilled in the art that modifications may be made without departing from the spirit and scope of this invention as defined by the following claims.

What is claimed is:

1. Apparatus for opening and flattening a seam having mating edges of fabric joined together along an elongated seam line, comprising:

an elongated buck having a convex outer surface adapted to support the seam with the mating fabric edges thereof outboard, said buck having an outer free end over which said fabric is drawn in the process of dressing said seam on said convex outer buck surface, said outer free end provided with a smoothly contoured notch therein oriented to guide said seam to a position atop said convex outer buck surface as said fabric is drawn over said buck in said dressing process, and an iron having a sole plate including a central elongated bottom surface region terminating at a forward edge in a pointed nose configuration to spread apart and thereby open the mating fabric edges of a seam when moved forwardly thereover along the seam line thereof, said central elongated bottom surface region having a length substantially less than the length of said buck and being concavely configured to correspond to said convex outer buck surface for overbusting a seam, which is sandwiched therebetween with the [melting] *mating* edges thereof adjacent said sole plate, by pressing said edges to form an angle along said seam line which substantially exceeds 180°, said convex and concave surfaces each having a radius of curvature of less than approximately two inches and more than approximately one-half inch to facilitate appreciable overbusting and avoid spring-back while minimizing criticality in alignment of said seam line on said buck.

2. The apparatus of claim 1 wherein said notch has an innermost base surface angled upwardly and inwardly to cam said seam upwardly onto said convex outer buck surface as said fabric is drawn over said buck in said dressing process.

3. The apparatus of claim 2 wherein said notch has a generally semi-circular cross-section when viewed parallel to said base surface thereof.

4. The apparatus of claim 2 wherein said base surface is angled inwardly and upwardly approximately 20° relative to an imaginary vertical plane disposed perpendicular to the longitudinal axis of said buck.

5. Apparatus for opening and flattening a seam of a tubular garment having mating edges of fabric joined together along an elongated seam line, comprising:

an elongated buck having a convex outer upper surface adapted to support the seam with the mating fabric edges thereof outboard, said buck having a lower region provided with longitudinally spaced orifices connectable to a source of pressurized gas to collectively provide downwardly directed gas jets which, when said tubular garment is dressed on said buck with said seam atop said convex upper surface, apply a radially outwardly and downwardly directed force against the lower section of said tubular garment from the interior thereof, pulling said seam dressed atop said convex upper surface tightly thereagainst to maintain it in said dressed position during said seam opening and flattening operation, and an iron having a sole plate including a central elongated bottom surface region terminating at a forward edge in a pointed nose configuration to spread apart and thereby open the mating fabric edges of a seam when moved forwardly thereover along the seam line thereof, said central elongated bottom surface region having a length substantially less than the length of said buck and being concavely configured to correspond to said convex outer buck surface for overbusting a seam, which is sandwiched therebetween with the mating edges thereof adjacent said sole plate, by pressing said edges to form an angle along said seam line which substantially exceeds 180°, said convex and concave surfaces each having a radius of curvature of less than approximately 2 inches and more than approximately ½ inch to facilitate appreciable overbusting and avoid spring-back while minimizing criticality in alignment of said seam line on said buck.

6. Apparatus useful for opening and flattening a seam of a tubular garment having mating edges of fabric joined together along an elongated seam line, comprising:

an elongated buck having a convex outer upper surface adapted to support the seam with the mating fabric edges thereof outboard, said buck having a lower region provided with longitudinally spaced orifices connectable to a source of pressurized gas to collectively provide downwardly directed gas jets which, when said tubular garment is dressed on said buck with said seam atop said convex upper surface, apply a radially outwardly and downwardly directed force against the lower section of said tubular garment from the interior thereof, pulling said seam dressed atop said convex upper surface tightly thereagainst to maintain it in said dressed position during said seam opening and flattening operation, said convex surface having a radius of curvature of less than approximately two inches and more than approximately one-half inch to facilitate appreciable overbusting and avoid spring-back while minimizing criticality in alignment of said seam line on said buck when said seam is opened and flattened with an iron having a concave sole plate configured to correspond to the convex curvature of said buck.

7. Apparatus for opening and flattening a seam of a tubular garment having mating edges of fabric joined together along an elongated seam line, comprising:

an elongated buck having a convex outer upper surface adapted to support the seam with the mating fabric edges thereof outboard, said buck having a lower region provided with longitudinally spaced orifices connectable to a source of pressurized gas to collectively provide downwardly directed gas jets which, when said tubular garment is dressed on said buck with said seam atop said convex upper surface, apply a radially outwardly and downwardly directed force against the lower section of said tubular garment from the interior thereof, pulling said seam dressed atop said convex upper surface tightly thereagainst to maintain it in said dressed position during said seam opening and flattening operation, and an iron having a sole plate including a central elongated bottom surface region terminating at a forward edge in a pointed nose configuration to spread apart and thereby open the mating fabric edges of a seam when moved forwardly thereover along the seam line thereof, said central elongated bottom surface region having a length substantially less than the length of said buck and being concavely configured to correspond to said convex outer buck surface for busting a seam which is sandwiched therebetween with the mating edges thereof adjacent said sole plate.

8. Apparatus useful for opening and flattening a seam of a tubular garment having mating edges of fabric joined together along an elongated seam line, comprising:

an elongated buck having a convex outer upper surface adapted to support the seam with the mating fabric edges thereof outboard, said buck having a lower region provided with longitudinally spaced orifices connectable to a source of pressurized gas to collectively provide downwardly directed gas jets which, when said tubular garment is dressed on said buck with said seam atop said convex upper surface, apply a radially outwardly and downwardly directed force against the lower section of said tubular garment from the interior thereof, pulling said seam dressed atop said convex upper surface tightly thereagainst to maintain it in said dressed position during said seam opening and flattening operation.

9. The apparatus of claim 8 wherein said buck has an outer free end over which said tubular garment is drawn in the process of dressing said seam on said convex outer buck surface, said buck end provided with a smoothly contoured notch therein oriented to guide said seam to a position atop said convex outer buck surface as said garment is drawn over said buck in said dressing process.

10. The apparatus of claim 9 wherein said notch has an innermost base surface angled upwardly and inwardly to cam said seam upwardly onto said convex outer buck surface as said garment is drawn over said buck in said dressing process.

11. The apparatus of claim 10 wherein said notch has a generally semi-circular cross-section when viewed parallel to said base surface thereof.

12. The apparatus of claim 10 wherein said base surface is angled inwardly and upwardly approximately 20° relative to an imaginary vertical plane disposed perpendicular to the longitudinal axis of said buck.

* * * * *